Dec. 19, 1967  W. L. BECKWITH, JR., ET AL  3,358,940
BOBBIN CONVEYOR

Filed Sept. 24, 1965  9 Sheets-Sheet 1

FIG. 1

INVENTORS
WALTER L. BECKWITH, JR.
ALAN H. NORRIS
RAYMOND V. TATA
BY
ATTORNEYS

Dec. 19, 1967 W. L. BECKWITH, JR., ET AL 3,358,940
BOBBIN CONVEYOR
Filed Sept. 24, 1965 9 Sheets-Sheet 2

INVENTORS
WALTER L. BECKWITH, JR.
ALAN H. NORRIS
RAYMOND V. TATA
BY
ATTORNEYS

Dec. 19, 1967   W. L. BECKWITH, JR., ETAL   3,358,940
BOBBIN CONVEYOR
Filed Sept. 24, 1965                                                  9 Sheets-Sheet 3

INVENTORS
WALTER L. BECKWITH, JR.
ALAN H. NORRIS
RAYMOND V. TATA
BY
ATTORNEYS

Dec. 19, 1967 W. L. BECKWITH, JR., ET AL 3,358,940
BOBBIN CONVEYOR
Filed Sept. 24, 1965 9 Sheets-Sheet 4

INVENTORS
WALTER L. BECKWITH, JR.
ALAN H. NORRIS
RAYMOND V. TATA
BY
ATTORNEYS

Dec. 19, 1967  W. L. BECKWITH, JR., ET AL  3,358,940

BOBBIN CONVEYOR

Filed Sept. 24, 1965  9 Sheets-Sheet 8

INVENTORS
WALTER L. BECKWITH, JR.
ALAN H. NORRIS
RAYMOND V. TATA
BY
ATTORNEYS

United States Patent Office 3,358,940
Patented Dec. 19, 1967

3,358,940
BOBBIN CONVEYOR
Walter L. Beckwith, Jr., Alan H. Norris, and Raymond V. Tata, Warwick, R.I., assignors to Leesona Corporation, Warwick, R.I., a corporation of Massachusetts
Filed Sept. 24, 1965, Ser. No. 489,860
14 Claims. (Cl. 242—35.5)

ABSTRACT OF THE DISCLOSURE

Apparatus for continuously replenishing an automatic winding machine with supply bobbins. A conveyor system carries bobbins from a remote hopper to a first reserve magazine. A second reserve magazine, distant from the conveyor system, supplies a winding mechanism with fresh bobbins as needed, and signals the first magazine to release bobbins as replacements for the bobbins discharged to the winding mechanism.

---

The present invention relates to winding machines of the automatic type wherein yarn is wound from supply bobbins into packages, and relates, more particularly, to a fully automatic apparatus for continuously replenishing the supply of bobbins in a reserve magazine as the bobbins therein become exhausted.

Throughout the present specification and claims it is to be understood that whenever the word "bobbin" is used, its meaning will be construed to include other forms of weft-carriers such as cops, ring tubes, quills, and pirns. Likewise, the term "yarn" is used in a general sense to designate all types of attenuated materials and the term "package" is employed for convenience of description to apply to any usual form of wound mass.

Reference is made to a U.S. patent and to a U.S. application for patent, each of which is of special interest in presenting the instant invention. The Patent No. 2,764,362 to William V. Goodhue et al. entitled "Winding Machine" and issued Sept. 25, 1956 discloses and claims a fully automatic winding machine for winding yarn or the like into various forms of packages. The winding machine of Goodhue et al. is fully automatic as to the winding process except that an attendant is required to continually replenish the supply of bobbins and manually place the free end of each into a stationary suction nozzle from whence automatic operation commences. The application of John P. Kieronski entitled "Winding Machine" bearing Ser. No. 230,051, and filed October 12, 1962, now Patent No. 3,217,235, discloses improvements to the apparatus of Goodhue et al. in that it provides a larger reserve magazine for wound bobbins, and automatic mechanism for discharging an exhausted bobbin, for loading a fresh bobbin, and for introducing the free end of the fresh bobbin into the winding operation.

The present invention is an apparatus generally employing the mechanism set forth in the cited references, and particularly is an addition to the Kieronski structure. The improvement disclosed herein consists in the continuous and automatic replenishment of bobbins contained in the reserve magazine adjacent to the winding mechanism. A hopper of wound bobbins is located remote from a multi-station winding machine; conveyors remove the bobbins from the hopper and carry them to whatever stations are in need of replenishment. Those wound bobbins which are rejected for lack of vacancies in the various magazines are returned to the hopper end of the conveyor and begin the conveyor journey once more, and adjacent to the hopper are joined by "new" bobbins which have replaced those (if any) which were advanced into the magazines on the previous journey. Thus, it will be appreciated that the operator's sole functions relative to the winding machine employing the advances to be disclosed presently consist of doffing the wound packages and donning a new package-receiving cone, maintaining the appropriate level of bobbins in the hopper, and providing whatever maintenance or trouble-shooting as may be necessary from time to time.

Accordingly, it is one object of the present invention to provide automatic apparatus to continuously feed wound bobbins from a remote source to the winding mechanism of a multi-station winding machine.

Another object of the present invention is to provide automatic apparatus for maintaining a given number of wound bobbins in the magazine of a winding machine adjacent its winding mechanism thereof.

A further object of the invention is to provide an automatic conveyor system which delivers bobbins from a remote source of supply to a plurality of winding stations to replenish the supply of reserve bobbins contained in the magazines thereof as the bobbins are exhausted.

Yet another object of this invention is the provision of gate means normally in closed position which prevents entry of a wound bobbin into a magazine but which, upon the exhaustion of a predetermined number of bobbins, will permit entry of bobbins into the magazine one by one.

Still another object of the invention is the provision of an automatic winding machine having apparatus to convey wound bobbins from a remote source to a winding mechanism and having a pair of magazines adapted to support wound bobbins in reserve, each magazine having an associated gate means selectively permitting entry of a bobbin thereinto.

Still a further object of this invention is to provide the combination of a winding machine and conveyor system in which wound bobbins are carried to the winding machine from a source and delivered thereto except that, if vacancies for wound bobbins are unavailable, they are returned for a later attempt at entry to the winding machine.

Another object of this invention is to provide apparatus to deliver wound bobbins from a supply hopper to a conveyor but which interrupts delivery to a flight thereof should a bobbin already occupy the flight.

Other and further objects will become more apparent upon a reading of the specification which follows taken in conjunction with the accompanying drawings.

In the drawings, in which like numerals refer to like elements throughout.

As was explained previously herein, the present invention is an improvement of the winding machines disclosed in the patent to Goodhue et al. and in the application for patent of Kieronski. The novel apparatus about to be described presents a structure for continuously and automatically maintaining the flow of wound bobbins to a winding machine for use in the winding process.

Briefly, the operation of the present invention is as follows. Bobbins are delivered from a hopper to the flights of an elevator conveyor at a location remote from the winding mechanism of a winding machine. They are transferred to a transverse or horizontal conveyor which carries the bobbins closely adjacent to a plurality of magazines which serve as a first location for retaining reserve bobbins. A pair of cooperating plates are actuated in the event of a vacancy in a magazine to permit the entry of a bottom thereinto, but remain inactive and allow the bobbin to continue on its journey on the horizontal conveyor in the event there is no vacancy in the magazine. Should a bobbin not be accepted into any of the plurality of stations having magazines, it will be returned to the elevator conveyor by means of an oscillating bin. The returned bobbin resting on a flight of the conveyor passes closely adjacent the point of entry of new bobbins thereon. Just prior to reaching said point of entry, the bobbin trips a projecting tab which actuates mechanism for preventing entry of a new bobbin onto the flight already occupied. The bobbin then continues on its journey and the aforedescribed process is repeated.

Once bobbins are received within the first magazine they are held there until called for by the second magazine which is located adjacent to winding mechanism and which is identical to the reserve magazine disclosed in the application of Kieronski. Upon the insertion of a bobbin into unwinding position which results in a vacancy in the said second magazine, linkage attached to the mechanism pushing the remaining bobbins therein toward the winding position actuates a gate device normally retaining bobbins in the first magazine and permits them to descend into the second magazine one by one. A chute serves to direct the bobbins from the former to the latter magazine.

Main elements of the invention

Figure 1:
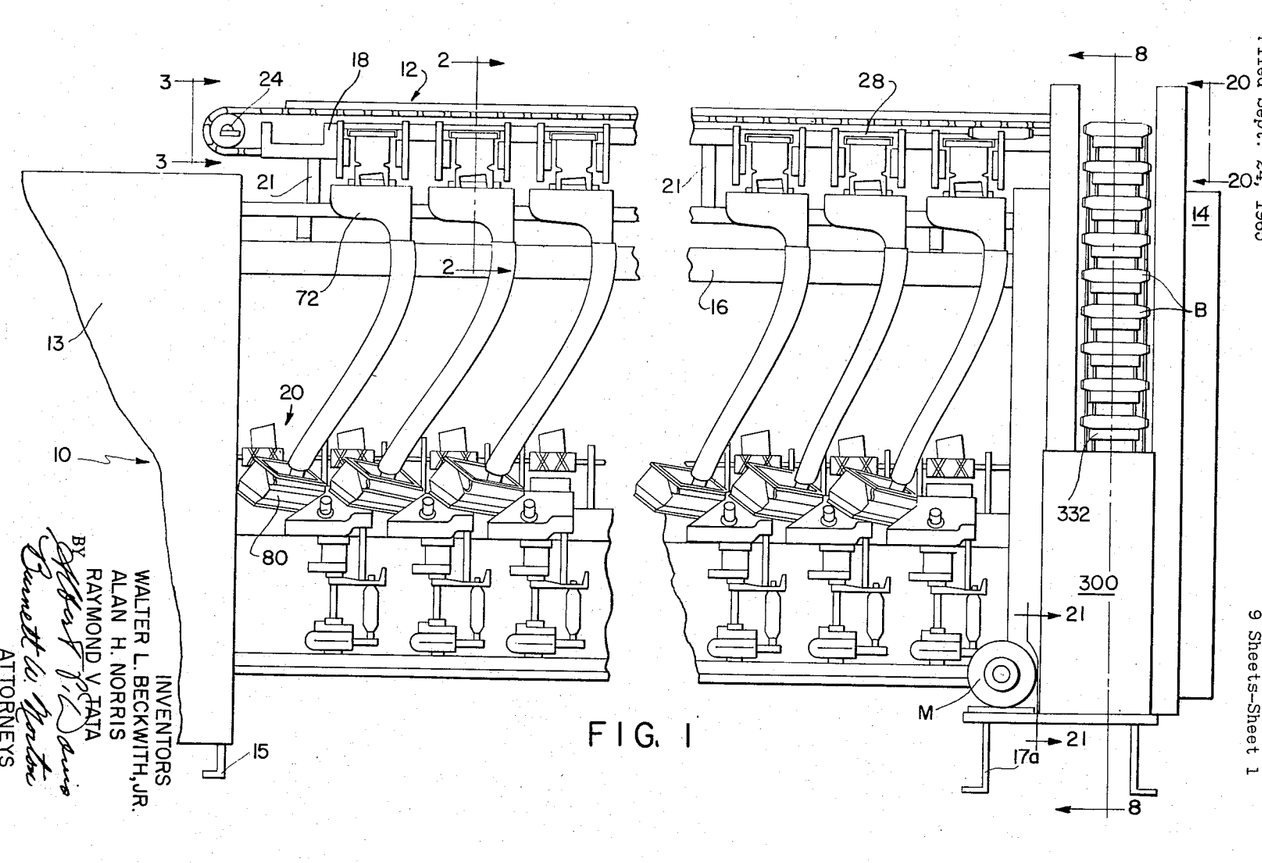
FIGURE 1 is a front elevation view of the novel conveyor apparatus shown in combination with a conventional multi-station automatic winding machine.

Referring now more particularly to the drawings, FIGURE 1 discloses the novel conveyor apparatus in an overall view and shows very generally many of the features of the invention. Throughout the description herein, it will be understood that reference to only one winding station or elements associated with only one winding station may be considered as being a reference to all other stations of a multi-station winding machine, since all are identical having common elements throughout. The major elements of the invention taken generally in the order of travel of a bobbin include as follows: a hopper having a pair of oscillating feeder plates and a mechanism for denying entry of a wound bobbin onto a flight of an elevator conveyor should a bobbin already occupy said flight; an elevator conveyor having a plurality of movable flights arranged to support bobbins thereon; a horizontal or transverse conveyor for transferring bobbins from the elevator conveyor to the winding apparatus, and for returning those rejected to the elevator conveyor; a first or upper magainze for retaining wound bobbins; a pair of cooperating plates which are located adjacent to the uppermost portion of the upper magazine and which serve to permit or prevent entry of a bobbin into the first magazine; a catch plate located at the bottom of the said first magazine which permits a bobbin to descend from said first or upper magazine to said second or lower magazine upon a signal from the bobbin advancing mechanism associated with the latter; a second or lower magazine which contains bobbins immediately adjacent to the winding apparatus and which has associated bobbin advancing mechanism to deliver the bobbins one by one into the winding apparatus; a chute connecting said first and second magazines and serving to guide bobbins from said first magazine to said second magazine; and a rockable platform located adjacent to the two conveyors which performs to direct returning bobbins from the horizontal conveyor onto the elevator conveyor in synchronism with the elevator flights.

In FIGURE 1, numeral 10 refers generally to an automatic winding machine having a plurality of winding stations such as is disclosed in the patent to Goodhue et al., cited earlier, although it is to be appreciated that the inventive principles herein set forth are applicable to other automatic winding machines as well.

Horizontal conveyor

Numeral 12 in FIGURE 1 generally indicates the horizontal conveyor which is positioned at the uppermost extremity of winding machine 10.

Support elements 13 and 14 define the limits of automatic winding machine 10 and are themselves supported on legs 15 and 17 respectively. Elements 13 and 14, however, not only provide terminal supporting structure for the winding machine, but house the drive machinery, vacuum equipment, electrical control system, and other allied equipment. A bridge member 16 extends between support elements 13 and 14 and besides providing structural integrity to the machines serves to mount lights (not shown) for illuminating the working area and as a shelf.

Numeral 20 generally indicates one of a plurality of winding stations similar in construction to those described in detail in the application of Kieronsi.

Located above and mounted to brackets 21 which extend upward from bridge member 16 is a horizontally disposed channel member 18 generally parallel to said bridge member and stretching between support elements 13 and 14.

Figures 2, 3, 9:
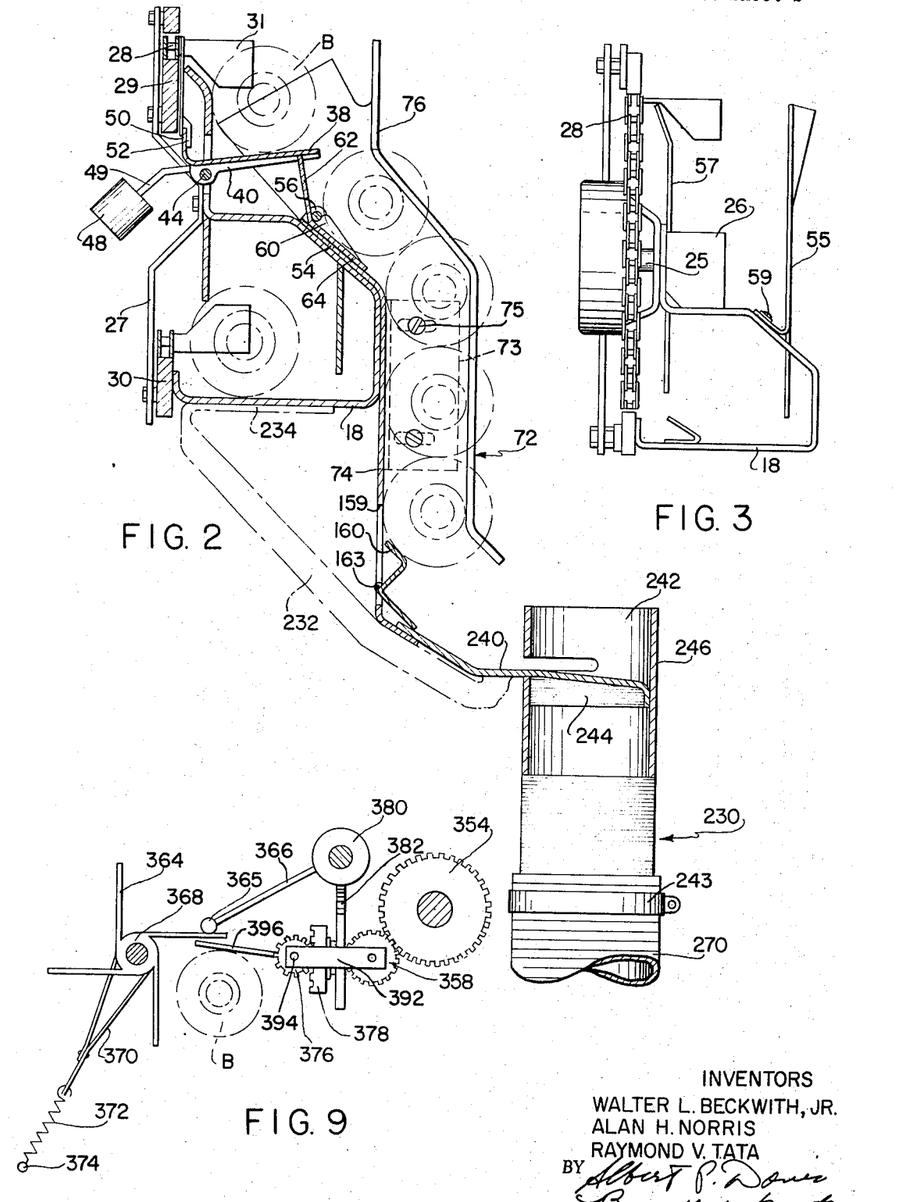
FIGURE 2 is a side elevation view partly in section taken along lines 2—2 of FIGURE 1.
FIGURE 3 is an end view of the horizontal conveyor farthest from the reserve bobbin hopper as taken along lines 3—3 of FIGURE 1.
FIGURE 9 is a side elevation view schematically illustrating the mechanism for interrupting delivery of a bobbin onto a flight of the elevator.

A pair of sprockets 24 and 24a are mounted on appropriate shafts 25 and 25a located at opposite ends of the horizontal conveyor 12. The shafts, in turn, are received for rotation within bearing blocks 26 fixed to both ends of channel member 18 (FIG. 3). Also fixed to channel member 18 at generally equally spaced apart intervals are vertically disposed bracket members 27 to which are mounted a pair of guide tracks 29 and 30, as shown in FIG. 2. Chain 28 is received over sprockets 24 and 24a and is guided by tracks 29 and 30.

A plurality of stampings 31 are fixed to chain 28 at equally spaced intervals and extend outwardly from the chain to engage bobbins in a manner and for purposes which will be described shortly. An electric motor M or other suitable source of motive power acting through appropriate gearing (not shown) drives shaft 328 and sprocket 326 thereon (see FIG. 8). Through chain 330 and sprocket 324 rotatably mounted on shaft 322, thence through appropriate gearing (not shown) and shaft 25a sprocket 24a and chain 28 thereon are driven by motor M.

At equally spaced intervals along the length of the horizontal conveyor 12 are positioned a plurality of trap plates 38 each having tabs 40 bent substantially normal to the plate having holes adapted to slidably receive shaft 44 therethrough. Said shaft is fixed to tabs 46 formed on the channel 18 and permits pivotal movement of the trap plate, but a weight 48 mounted on bent rod 49 which is firmly fastened to the plate by welding or other suitable means normally biases the plate to a position wherein the free edge is held higher than the mounted edge (see FIGURES 2 and 5a). The weight 48 is preferably adjustable, as, for example, by screw threads to vary the moment arm thereof to accommodate various sizes or weights of bobbins. Adjacent to the mounted edge of each plate 38, a lip 50 is seen to project upwardly therefrom. A cam member 52 cooperating with the lip 50 is fixed to chains 28 at intervals determined by the placement of stampings 31 thereon. The cam member 52 engages the lip 50 as the chain is translated and serves to hold trap plate 38 in its raised position as it passes thereacross. This holding action of the cam on the trap plate is in addition to the bias of weight 48; the plate is so held in its upright position until such time that the bobbin B being moved onto and across an individual trap plate 38 (which is slightly longer than the bobbin) rests fully thereon. Should a bobbin vacancy occur in the reserve magazines of the winding machine, a bobbin is released from the trap plate and delivered into the reserve bobbin magazines in a manner to be described. It is necessary that the bobbin be delivered in essentially horizontal position lest it jam in the upper magazine, generally indicated at 72 (see FIGURE 4), and it is for this reason that cam 52 holds trap plate in its raised position until a bobbin rests fully thereon, at which time the cam continuing to translate with chain 28, moves out of engagement with lip 50. If a vacancy exists in the reserve magazines, the bobbin when completely supported on plate 38 urges said plate in a downward pivotal movement (see FIGURE 2) about shaft 44 against the bias of weight 48, permitting the bobbin to drop into the upper reserve magazine. Thus a cam 52 is associated with each stamping 31, the two elements being spaced apart by such a distance that when stamping 31 pushing a bobbin along reaches the near end of a trap plate 38, the cam 52 preceding it simultaneously moves out of engagement with lip 50. This construction will be understood by reason of the fact that as soon as stamping 31 reaches the near end of the trap plate 38, the bobbin rests fully thereon.

Plate 74 forming the base member of upper magazine 72 is fastened to channel member 18 as by screws 70. On the sloping portion 54 of plate 74 are formed a pair of upward extending ears 56 which have a shaft 58 fixed at the ends thereto. A swivel plate 60 has a pair of projections formed at the ends thereof which are slidably received on the shaft 58 to permit rocking movement thereon. Plate 60 is bent adjacent shaft 58 to form an obtuse angle between upper side 62 and lower side 64. The ends of lower side 64 are flared upwardly as at 66 (see especially FIGURE 5a), and is cut out as indicated at 67. The flared portions 66 present a pair of edges down which a bobbin may roll. These edges act to eliminate axial movement of the bobbin as it passes thereover to more accurately direct it to the reserve magazine 72 located below. The cut out 67 so lightens lower side 64 of swivel plate 60 that the latter is normally urged by gravity, in the absence of any external force, to rotate in the counterclockwise direction from the position shown in FIGURE 5a to that shown in FIGURE 5b wherein upper side 62 has come to rest generally parallel to sloping portion 54 of plate 74.

It will be seen (particularly in FIGURE 5a) that the trap plate 38 bears against the uppermost edge of swivel plate 60 when lower side 64 is held in contact with sloping portion 54 by means of a bobbin B resting thereon. Thus swivel plate 60 aids weight 48 and serves roughly the same purpose as cam 52 in holding trap plate in its raised position. However, when a bobbin is no longer supported on lower side 64 and a bobbin is completely supported on trap plate 38 (see FIGURE 2), swivel plate 60 pivots in a counterclockwise direction from the position shown in FIGURE 5a to that shown in FIGURE 5b. With plate 38 resting on upper side 62 which in turn engages sloping portion 54, a bobbin is enabled to roll off plate 38 and onto lower side 64 of swivel plate 60. Thereupon, plate 38, under the bias of weight 48, return to its normal position and the bobbin comes to rest on lower side 64 whereupon the swivel plate 60 again assumes the position illustrated in FIGURES 2 and 5a. Of course, it is understood that a bobbin will come to rest on lower side 64 only if the reserve magazine located beneath swivel plate 60 has a sufficient number of bobbins therein to hold a last bobbin on said lower side. Bobbins will continue to enter magazine 72 upon assuming delivery position on plate 38 until such time that said magazine becomes entirely filled. When the upper magazine 72 is completely filled, a bobbin comes to rest on lower side 64 as seen in FIGURE 2 and by virtue of upper side 62 engaging the underside of trap plate 38, additional bobbins are prevented from entering. Continuing the process, when the bobbins in upper magazine 72 become depleted such that the uppermost bobbin descends and moves out of supporting engagement in lower side 64, plate 60 again assumes the position of FIGURE 5b and the next bobbin advancing along conveyor 12 is admitted as previously described.

*Upper reserve bobbin magazine*

Secured to and depending from channel member 18 is the first or upper reserve magazine previously alluded to as being generally indicated at 72. This magazine is formed of a substantially vertically disposed plate 74 and a pair of parallel, spaced apart, track members 76 mounted as at 77 so as to more easily direct a bobbin into upper magazine 72. Plate 74 is secured to channel 18 as by screws 70. Screws 71 pass through elongated slots formed in angle brackets 73 to fasten said angle brackets to channel 18. The angle brackets also have elongated slots formed therein which receive screws 75 for mounting track members 76 thereto. It will be appreciated that by loosening screws 71, the spacing of the track members can be altered to accommodate bobbins of a desired length. It will further be appreciated that by loosening screws 75, the distance between each of the track members 76 and plate 74 can be altered to accommodate bobbins of a desired diameter. Obviously, only bobbins of uniform diameter and length are to be employed for any one winding run.

At the lower end of plate 74 is formed a cut out 159 which accommodates catch plate 160 therein. Having a cross section which is roughly Z-shaped, the catch plate is formed with ears 163 which are pierced and slidingly receive therethrough shaft 165 for pivotal movement.

*Catch plate mechanism*

Figures 4, 6A, 6B, 7:
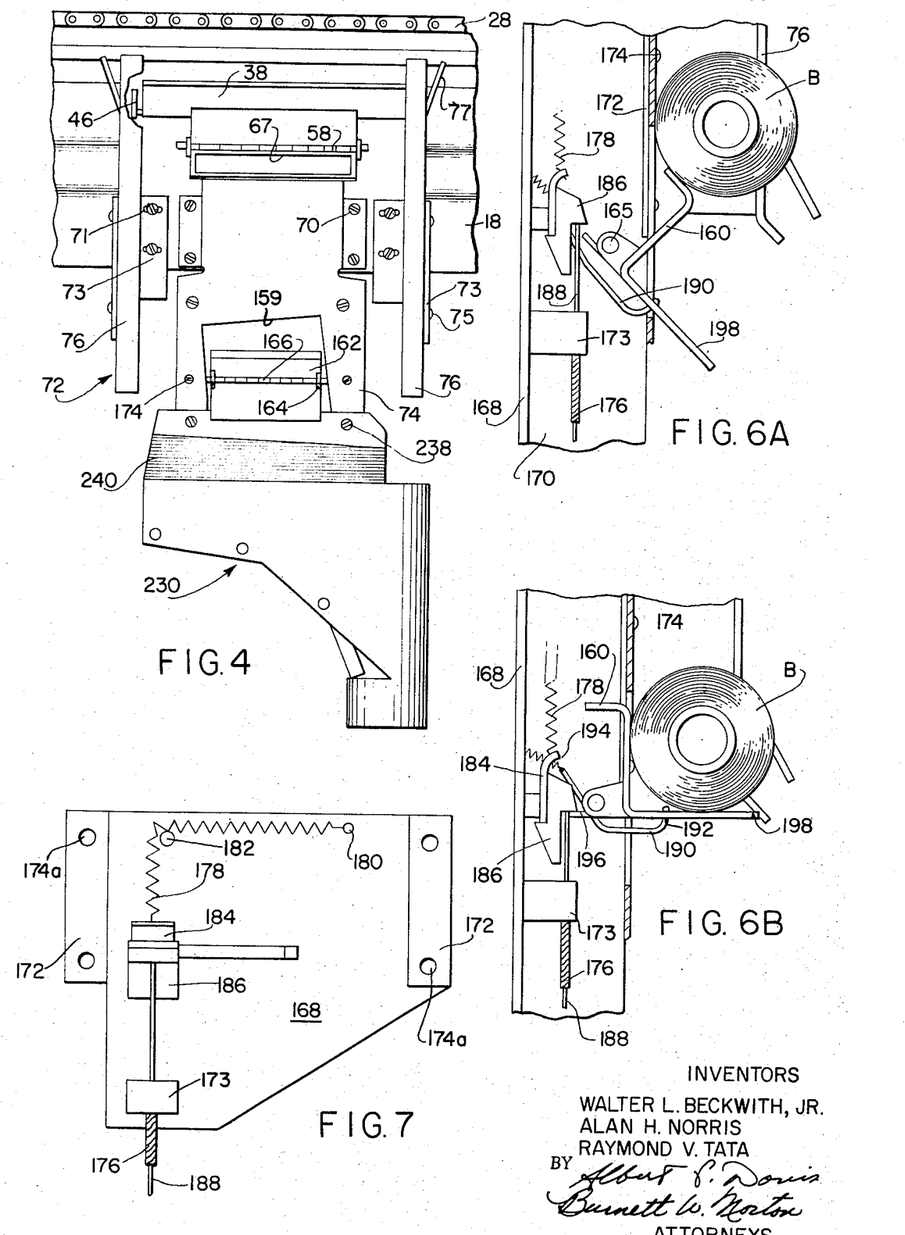
FIGURE 4 is a front elevation view of the upper reserve bobbin magazine and associated mechanism.
FIGURES 6a and 6b form a pair of similar side elevation views, partly in section, which illustrate two successive positions of the catch plate.
FIGURE 7 is a top plan view of the catch plate actuating mechanism adjacent thereto.

Located generally parallel to and spaced from plate 74 is a base member 168 which is equipped with sides 170 extending toward said wall and terminating at coplanar flanges 172 extending from said sides parallel to said base member. The flanges 172 are formed with clearance holes 174a for mounting to plate 74 as with screws 174 or other suitable fastening means. Shaft 165 which mounts catch plate 160 for pivotal movement is fastened at the ends to sides 170 of base member 168 by means of snap rings or the like. Fixed to the corner of the base member 168 distant from sides 170 is an anchor 173 for one end of cable housing 176, the other end of which terminates near the second or lower magazine, which will be subsequently described. As is best seen in FIGURES 6a, 6b, and 7, a tension spring 178 is fixed at one end in hole 180 of base member 168. The spring passes around capstan 182 and is secured at the other end to floating plate 184. A latch 186 is fastened to the floating plate 184 and has one end of a cable 188 secured thereto.

With particular reference to FIGURES 6a and 6b, a generally L-shaped wire or toggle member 190 is held at one end in hole 192 of catch plate 160. The other end of wire 190 is fastened to spring 194 which in turn is fastened to base member 168. In FIGURE 6a, catch plate 160 is shown holding bobbin B in upper magazine 72 in cooperation with the track members 76 which restrain the bobbin ends therewith. The force of spring 194 acting through wire 190 is seen to bias plate 160 to the holding position of FIGURE 6a. However, as cable 188 is drawn downward (as seen in FIGURES 6a, 6b and 7) in accordance with mechanism yet to be described, latch member 186 engages pawl 196 to rotate catch plate 160 in a counterclockwise manner to permit bobbin B to come to rest on shelf 198 of said plate. Upon relaxation of the tension in cable 188, the weight of the bobbin resting on shelf 198 and the force of spring 178 act together to return latch 196 and plate 160 to their original positions thereby permitting delivery of the bobbin to the second or lower magazine.

Bobbin chute

A bobbin chute is provided for guiding wound bobbins from the upper magazine 72 to the lower magazine 80. However, it will be understood that the present invention would function without such a chute. For example, the bobbin could be permitted to fall freely under the force of gravity from the upper magazine to the lower magazine. Turning now to the bobbin chute there is disposed between the upper reserve bobbin magazine 72 and the lower magazine 80 a pair of stationary bobbin directing agencies positioned to pass a wound bobbin from said upper magazine to said lower magazine. In the process of delivering the bobbin from the one location to the other, these agencies also perform to rotate the bobbin from the horizontal position to the vertical or up-ended position, the latter being the required position for unwinding.

The upper bobbin directing agency is a funnel-shaped device generally indicated by reference numeral 230. An angle member 232 as seen in phantom in FIGURE 2 projects outward and downward, the laterally extending flange 234 thereof being bent back and secured as by welding to the under side of channel 18. Secured as by bolts 238 to the plate 74 and supported on angle member 232 is slide 240 which slopes gently toward funnel 230 adjacent thereto. Immediately adjacent to the funnel exit 242, slide 240 is bent as at 244 at a relatively steep angle to aid the delivery of a bobbin into the narrowed portion of funnel 230.

Directly beneath funnel 230 is positioned the second of the stationary bobbin directing agencies, chute 270. The chute has a diameter large enough to pass any size contemplated bobbin and is formed of any suitable flexible material or construction. One end thereof is secured to the base of funnel exit 242 by means of an adjustable clamp 243; likewise, the other or bottom end of chute 270 is secured to ring 250 by means of an adjustable clamp 252.

In operation, it will be understood that as a bobbin B is reeased from the upper magazine 72 by the actuation of trigger plates 162, it rolls down slide 240 until it strikes face plate 246, then slides laterally down incline 244 into funnel 230, from whence it passes through chute 270 into lower magazine 80. Thus, it is seen that the cooperating elements, funnel 230 and chute 270, act upon a bobbin to alter the altitude thereof from the horizontal delivery position to the vertical or up-ended unwinding position.

Lower magazine and catch plate actuating mechanism

The lower reserve bobbin supply magazine disclosed herein is substantially identical to that set forth in the previously cited application for patent of John P. Kieronski. Although the novelty of the present invention does not reside in the mechanism disclosed in the Kieronski application, the structure of that invention is presented at this time as it is deemed necessary for a complete understanding of the present invention. For this reason, the present description will employ reference numerals identical to said application to describe identical elements applicable to this disclosure.

As herein illustrated, the present invention includes a lower magazine 80 for retaining reserve supply bobbins B in position for ready transference, one by one, to a yarn carrier. Accordingly, and referring to FIGURE 1, the magazine 80 is affixed to the supporting structure of the automatic winding machine 10 by suitable means such as bolts (not illustrated) which pass through holes provided in a wing-like extension 89 (see FIGURE 11) projecting generally forwardly from a side wall 82. In addition to wall 82, magazine 80 is comprised of a further side wall 84 which is oppositely disposed from wall 82. The two walls are connected by a bottom wall or floor 86 and end panel 88. Advantageously, the magazine is mounted at a compound angle to the floor so that, in its longitudinal dimension, it inclines downwardly as it extends rearwardly toward the frame of the winding machine, as seen in FIGURE 1. At the same time, magazine 80 is tilted somewhat forwardly, so that, in its transverse dimension, its top inclines outwardly, i.e., toward the viewer as seen in FIGURE 1. So situated, reserve bobbins B lying in a generally upright position with their longitudinal axes perpendicular to the surface of bottom wall 86, will lean against wall 82. Also, their axes incline somewhat rearward and downward following the alignment of floor 86 of the magazine. By the foregoing arrangement, the reserve bobbins tend to gravitate generally downwardly, that is, away from end panel 88 to a suitable position for transference to the yarn carrier. In order to prevent the reserve bobbins from shifting and possibly falling over in the magazine, light pressure is applied against the sides of bobbins to urge them against wall 82 by a movable plate 90 which is a hinged upward extension of wall 82 (see FIGURE 13). Plate 90 is biased by a leaf spring 92 to bear on the diameter of the bobbins lying in the magazine. A generally circular chamber 94 forms the forward end of the magazine 80, this chamber being defined by a relatively high wall adapted to receive one bobbin at a time in an upright position.

Referring now to FIGURES 11 through 19, it is desirable in the course of operation of the magazine that positive means be provided to assist the gravitational urging of succeeding reserve bobbins into chamber 94. In this connection, a rod 96 which is supported in a pair of spaced brackets 98 and 99 extends longitudinally along substantially the full rear side of wall 82. An angular element or "slider" 100 is mounted on rod 96, the rod serving as a track along which the slider is movable. Slider 100, in turn, supports a pair of elements 102 and 104 which are joined together by a pin 105, extending through a section of slider 100, for rotation about a vertical axis, each of these elements being aligned with an elongated slot 106 and 108, respectively, in the side of wall 82 (FIGURES 14 through 17). A horizontally positioned U- shaped member or "pusher bar" 110 is secured at its opposite terminal ends to elements 102 and 104 respectively and projects through slots 106 and 108. The main U-shaped body of the pusher bar 110 is disposed on the opposite side of wall 82 from the elements 102 and 104, i.e., projecting into the bobbin holding channel of the magazine. A flat link 112 is supported on a pin 114 embedded in the lower end of slider 100. Link 112 extends upwardly from its mounting pin 114 and is connected through an upwardly projecting stud 116, affixed at the upper end of said link, to one side of element 102. Pin 114 affords limited rocking movement to link 112 for purposes to be explained hereafter.

A relatively long arm 119 is connected near its upper end to link 112 by a flat-headed stud 113 which loosely passes through an extended slot 120 in arm 119 and is embedded approximately at the midpoint of the link. Toward the distal end thereof, arm 119 is secured for rockable movement on a post 122 suitably journaled for rotation on a mounting plate 202 depending from wall 82 (see FIGURE 11) and mounted as by bolts 200. A rocker arm 510 is pivotally mounted to plate 202 about shaft 512. The far end of rocker arm 510 has formed thereon a cam follower 514 while midway between the ends of the arm is connected link 516 at pivot 518, the other end of the link connected to arm 119 as at 520. Rocker arm 510 is pushed by external means (not shown) to operate the linkage just related for actuating arm 119. A spring 138 is extended between a stud 140, fixed at the end of wall 82, and a suitable hole pierced through the end of an extension to arm 119. So located, spring 138 biases arm 119 forwardly, or clockwise as viewed in FIGURE 11, in turn causing pusher bar 110 to exert a force against the bobbins B in magazine to push them toward chamber 94. A resilient collar 142 made of rubber or the like is mounted on rod 96 between bracket 99 and slider 100 to absorb the shock of the slider as it is thrust forward by spring 138. Similarly, a corresponding bumper 143 is located in wall 82 adjacent the opposite end of rod 96 to absorb the energy of the rearward thrust of slider 100. Further, contact of link 112 with bumper 143 during the rearward sweep of arm 119 will serve to rock the link 112 clockwise on its pivot 114 (FIGURE 11) thereby swinging pusher bar 110 outwardly perpendicular to wall 82.

Figure 11:
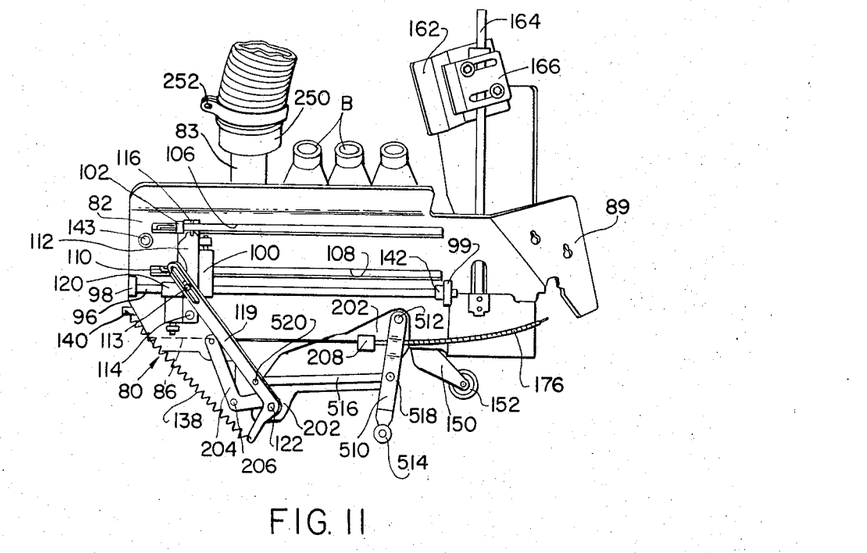
FIGURE 11 is an elevational view of the lower bobbin magazine.
Figure 12:
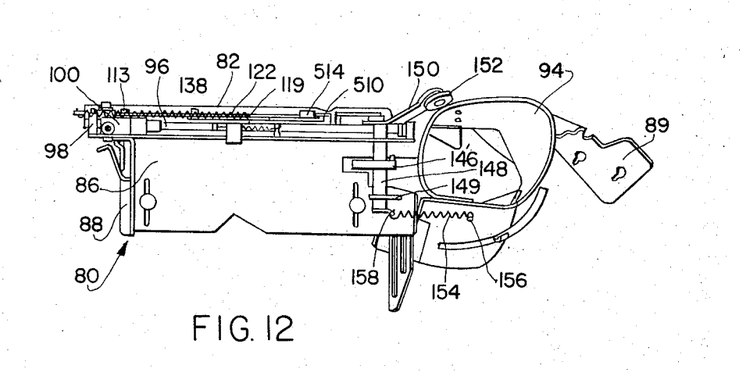
FIGURE 12 is a bottom plan view of the bobbin magazine of FIGURE 11.
Figure 13:
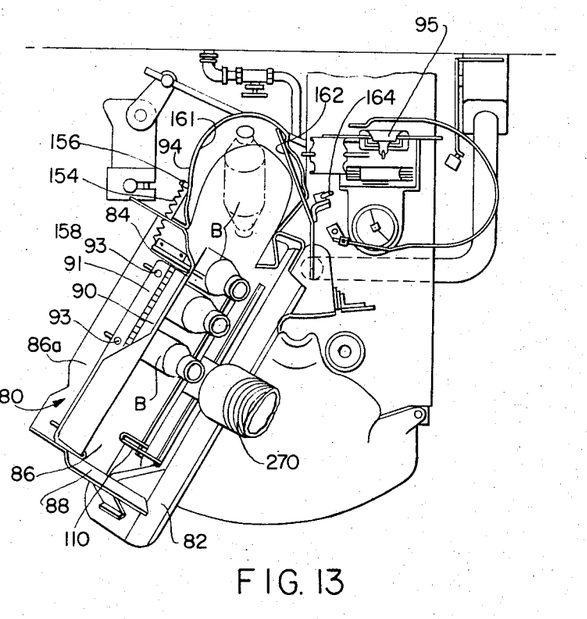
FIGURE 13 is a top plan view of the winding machine and illustrating the lower bobbin magazine in its operative relationship therewith.
Figure 14:
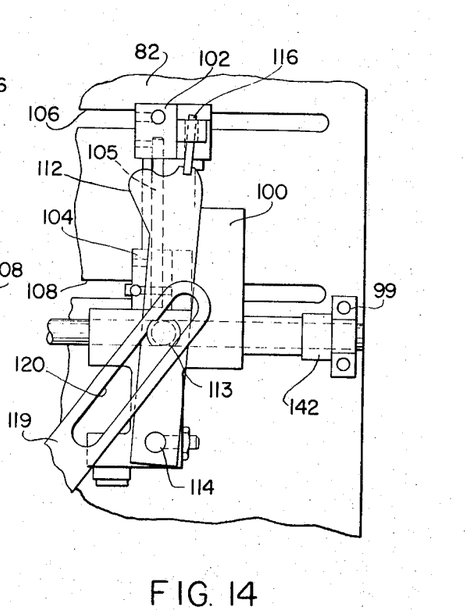
FIGURE 14 is an enlarged fragmentary view partly in section of parts for controlling the operation of the bobbin magazine.

As best seen in FIGURE 13 a bobbin stop 144 in the form of an upstanding rib is fastened to the top of floor 86 of the magazine and extends transversely thereto immediately adjacent chamber 94. Stop 144 serves to receive the base of the forwardmost bobbin in the magazine thereagainst, thus preventing the free movement of the supply bobbins into chamber 94. Positioned closely behind stop 144 in a longitudinal slot 145 (FIGURE 12) provided in floor 86 is a segment 146 secured to a rotatable stub shaft 148 journaled at one of its ends in wall 82 and held at its opposite end in a boss 149 for rockable movement about a horizontal axis (FIGURE 12). The end of stub shaft 148 projecting outwardly beyond wall 82 supports an offset arm 150 which inclines somewhat downwardly (FIGURE 11) and carries a cam follower 152 at the lowermost end thereof. As will be explained shortly cam means are provided which rock arm 150 clockwise as viewed in FIGURE 11. This motion rocks segment 146 upwardly causing it to contact the bottom of bobbin B and lift it upwardly for a distance, said rocked positions of the arm 150 and segment 146 being depicted by the broken lines in FIGURE 11. Since the vertical "throw" of segment 146 is greater than the height of stop 144 the base of bobbin B will be elevated above the stop. At this point pusher bar 110 acts to push the bobbin forwardly over the stop and into chamber 94. A spring 154 (see FIGURE 12) is extended between a pin 156 in the wall of chamber 94 and a pendant 158 on the inner end of stud 148 adjacent boss 149. Spring 154 serves to bias segment 146 into its inoperative position, i.e., to rotate it counterclockwise on stub shaft 148.

Turning again to FIGURE 13 the rear section of chamber 94 has a relatively high wall 161 which acts to contain the reserve supply bobbin received therein in essentially an upright position. In order that the bobbin, as it is transferred into chamber 94, will not inadvertently tip over, a guide a plate 162 is positioned atop a standard 164 affixed to the lower end of the chamber. The guide plate 162 acts to direct the bobbin vertically into chamber 94 while the bobbin is being shifted by segment 146. Guide plate 162 extends from a point approximating the upper forward terminal end of wall 82 and terminates closely adjacent one edge of wall 161. An adjustable bracket 166 serves to mount guide plate 162 on standard 164.

Figure 15:
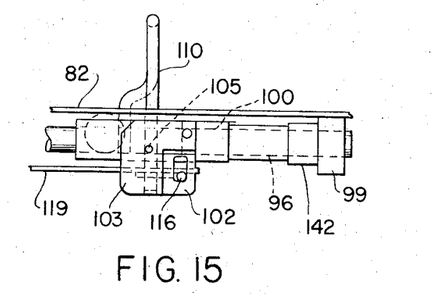
FIGURE 15 is a top plan view corresponding to FIGURE 14.
Figure 16:
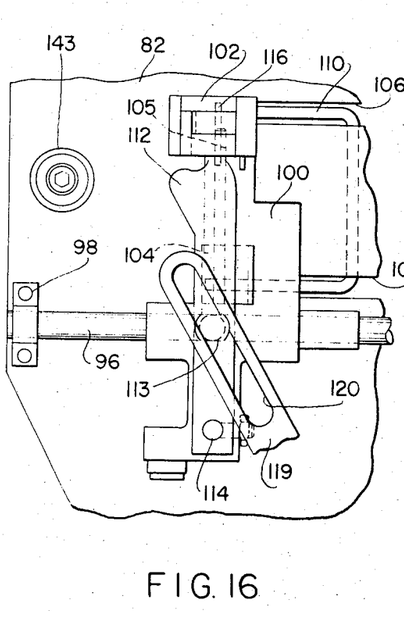
FIGURE 16 is a view corresponding generally to FIGURE 14 but illustrating the parts in a different position.
Figure 17:
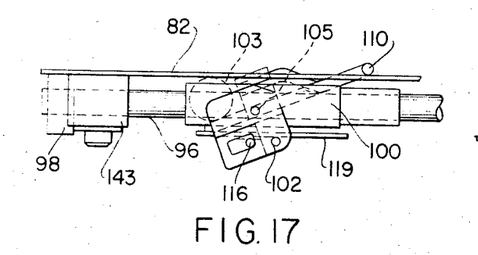
FIGURE 17 is a top plan view corresponding to FIGURE 16.

Advantageously, pusher bar 110 is actuated through a pushing cycle after each occurrence of a new bobbin being loaded from the upper magazine 72 into chamber 94 of lower magazine 80. This insures that the pusher bar will always retreat behind and gather in any reserve supply bobbins which have been loaded manually into the magazine. Thus, as anvil 136 is cammed to the left as viewed in FIGURE 11 by external means (not shown), arm 119 is rocked correspondingly counterclockwise carrying pusher bar 110 along therewith. In consequence of this rocking of arm 119, slider 100 and its associated elements are pushed to the rear of the magazine, i.e., to the left viewing FIGURE 11. By virtue of the fact that the arm 119 and slider 100 are connected through stud 113 and flat link 112, the initial force from the arm 119 causes link 112 to rock a slight amount about pin 114 in a counterclockwise direction (see FIGURES 11, 14, and 16). Such rotation causes element 102, connected to link 112 by pin 116, and element 104 which is operably joined with element 102 through pin 105, to rotate clockwise from the position illustrated in FIGURES 14 and 15 to the position of FIGURES 16 and 17. Pusher bar 110 is thereby, in effect, collapsed against wall 82, as best seen in FIGURE 17, and will slide rearwardly in the magazine without affecting the position of any upright bobbins standing therein. With the release of anvil 136 from its camming means, slider 100 will have reached its rearward or retracted extreme. In this location link 112 is caused to contact bumper 143 resulting in the link being rocked forward abruptly. This causes elements 102 and 104 to pivot clockwise to the position of FIGURE 15. As a consequence thereof pusher bar 110 is swung outwardly extending transversely of the channel of magazine 80 and, so arranged, will obviously engage with the rearmost bobbin B in the magazine. Spring 138 will cause pusher bar 110 to exert a continual biasing force which is transmitted through all of the bobbins and will eventually serve to push the bobbin nearest to chamber 94 over stop 144 at the appropriate time as previously related. During this forward pushing movement pusher bar 110 cannot swing away from the bobbins, that is, it cannot swing further counterclockwise as viewed in FIGURE 15 since element 102 is flattened on one of its sides 103 to bear against the rear side of wall 82 when rotated to the point where pusher bar is fully extended into the path of the bobbins (see FIGURE 15). However, element 102 does have a suitable radius on one corner which permits movement of the pusher bar in the quadrant from wall 82 as shown in FIGURE 17 to its fully extended position as illustrated in FIGURE 15. From the foregoing construction it will be appreciated that whenever arm 119 is moved counterclockwise about post 112 (FIGURE 11) pusher bar 110 will assume the position of FIGURE 17, i.e., collapsed against wall 82. Conversely, at such times as arm 119 is moved in the opposite direction, pusher bar 110 will be swung outwardly as shown in FIGURE 15.

A support bracket 83 is adjustably fastened as by bolts (not shown) to side wall 82 of magazine 80 so as to be positioned at one of a plurality of locations along said wall. Integral with and located at the top end of bracket 83 is a ring 250 which receives thereon the bottom end of chute 270. Adjustable clamp 252 secures the bottom end of the chute to ring 250 such that bobbins released from the upper magazine 72 are delivered to the lower magazine 80 in standing or up-ended position. An anchor member 208 is secured to element 202 and serves to retain an end of cable housing 176. It will be recalled that the other end of the housing 176 is retained in anchor 173 secured to base plate 168, as illustrated in FIGURE 6. The near end of cable 188 is adjustably fastened to the long limb of dog leg 204 as by collar 210 and screw 212, said dog leg pivotally mounted to stub shaft 206 in mounting plate 202. Screw 212 can be loosened to adjust the length of cable between anchor 208 and collar 210, then tightened to maintain the spacing therebetween. The reason for this adjustment will be described subsequently.

Adjacent the short end of dog leg 204 is cam follower 214 adapted to engage pin cam 216 which is secured to arm 119. Abutment 218 fixed to mounting plate 202 acts to prevent further clockwise rotation of dog leg 204 beyond that point.

Figure 5A:
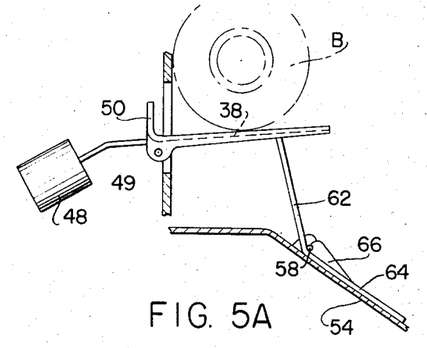
FIGURES 5a and 5b form a pair of similar side elevation views, partly in section, which illustrate two successive positions of the cooperating trap plate and swivel plate.
Figure 5B:
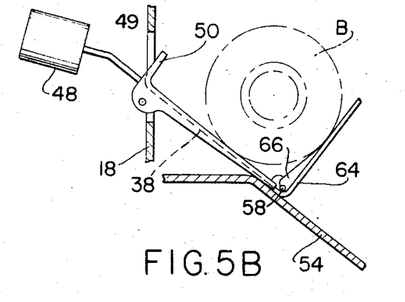
Figure 18:
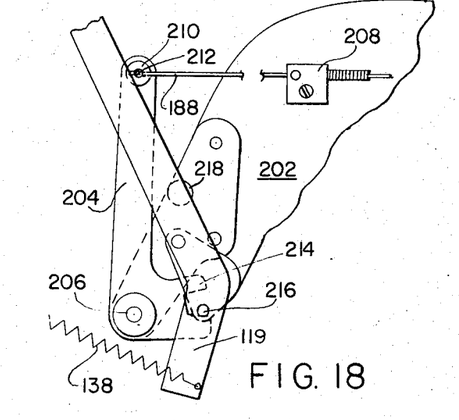
FIGURE 18 is a fragmentary front elevation view of the remote mechanism for actuating the catch plate.
Figure 19:
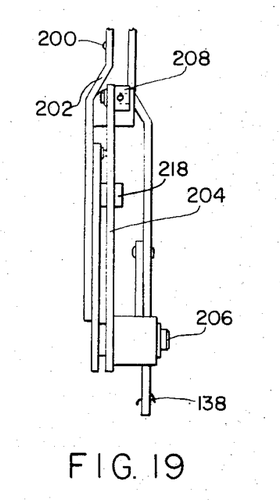
FIGURE 19 is a side elevation view of the mechanism of FIGURE 18.

The operation of the catch plate 160 and associated mechanism is as follows. When arm 119 is rocked clockwise to the left hand end of magazine 80 (FIGURE 11) carrying pusher bar 110 along therewith, and then returns to the right under the influence of spring 138 pusher bar 110 is swung outwardly extending transversely of the channel of magazine 80 (FIGURE 15) and engages the rearmost bobbin B in the magazine. As previously described, spring 138 causes pusher bar 110 to exert a continual biasing force to all the bobbins, pushing the bobbin nearest chamber 94 against stop 144, and at the appropriate time, over stop 144 into chamber 94. As the arm 119 rocks in the clockwise direction (FIGURE 11), pin cam 216 mounted thereon engages cam follower 214 to rotate dog leg 204 in a counterclockwise direction about stub shaft 206, as seen in FIGURE 18, thereby drawing cable 188 to the left which is analagous to drawing said cable downward as seen in FIGURES 5a, 5b, and 6. Thus, the counterclockwise pivoting movement of dog leg 204 pulls latch 186 into contacting engagement with projection 196 to rotate catch plate 160 from the position of FIGURE 6a to the position of FIGURE 6b against the bias of spring 194.

The length of cable 188 is adjusted as by collar 210 and screw 212 such that when the position of pusher bar 110 against the rearmost bobbin B indicates that room is available in the magazine for another bobbin, the catch plate will be actuated to permit entry of a bobbin from the upper magazine 72 into the lower magazine 80. The length of the cable is selectively adjustable to set the particular position of pusher bar 110 in its movement toward chamber 94 at which catch plate 160 is to be actuated.

After a bobbin B has been delivered to the lower reserve magazine 80 via chute 270, the weight of the bobbin on shelf 198 (see FIGURE 6b) and the bias of spring 194 returns trigger plate 162 once more to the holding position of FIGURE 6a. In like manner and as seen in the same figure, the bias of spring 178 urges the return of latch 186 to the inactive position, cable 188 having drawn dog leg 204 to rest against abutment 218.

*Hopper and vertical conveyor*

Placed at a location remote from the winding stations 20 of the multi-station winding machine 10 is a bobbin hopper 300 which provides a supply of wound bobbins and mechanism for continuously feeding them to the conveyor system for delivery to said winding stations.

Figures 8, 8A:
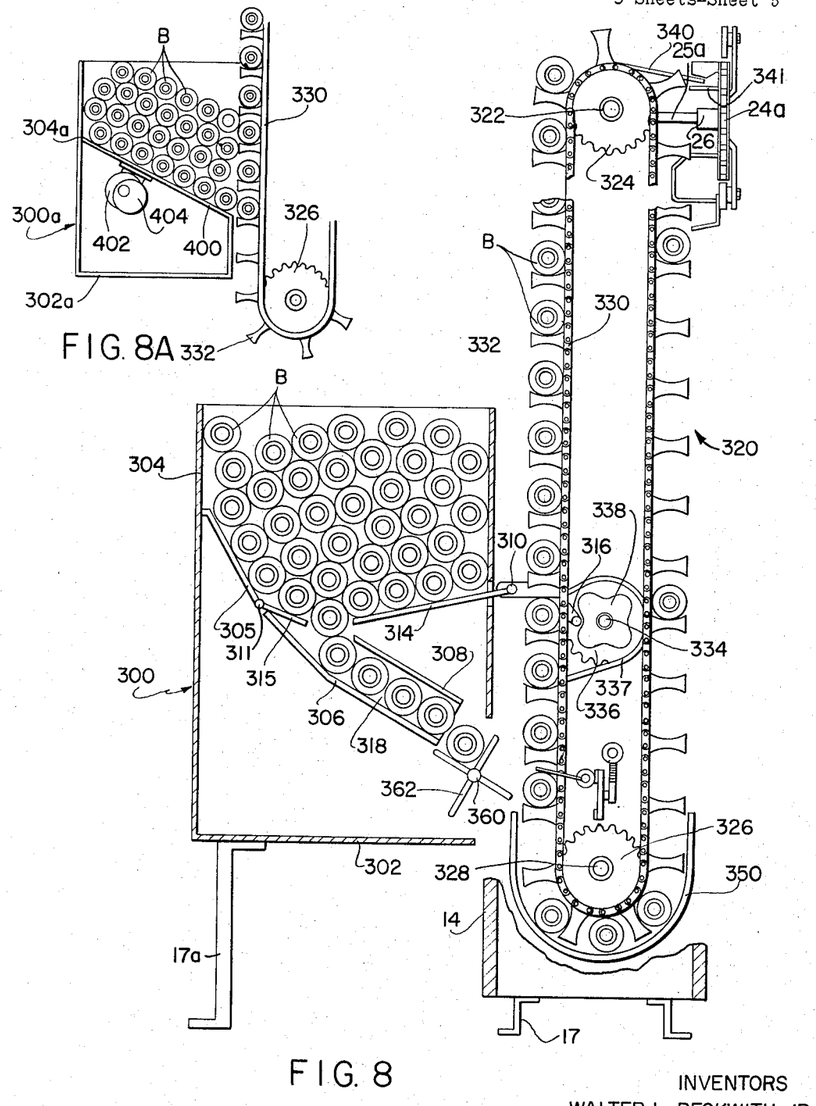
FIGURE 8 is a side elevation view, partly in section, schematically illustrating the elevator conveyor and bobbin hopper.
FIGURE 8a is an alternate form of hopper to that shown in FIGURE 8.

As seen most clearly in FIGURE 8, the hopper includes a base 302 and walls 304 and is supported on pedestal legs 17a. Floor members 305 and 306, inclined toward conveyor 320 for directing bobbins to the exit location, is fixed to the walls 304 as by welding or other suitable means. Essentially parallel to and spaced from the floor member 306 by a distance somewhat greater than the diameter of a bobbin is a guide plate 308 which is also fixed to the walls 304.

A pair of shafts 310 and 311 extends between walls 304 and each is mounted for rotation in suitable bearings (not shown). Fixed to the shafts are feeder plates 314 and 315, respectively. A linkage connects the two shafts, arm 410 fixed to shaft 310, arm 411 fixed to shaft 311, and arm 413 pivotally connected at both ends to the depending arms 410 and 411. A tension spring 414 extends between arm 411 and screw 374 which also fastens spring 372 to side wall 304. A cam follower 316 is fixed to shaft 310 and is acted upon by a cam mechanism to be described for rocking the feeder plates 314 and 315 thereby to urge bobbins into the delivery trough 318 defined by floor 306 and guide plate 308. Bobbin dispatch mechanism for directing bobbins from the hopper 300 onto the flights 332 of elevator conveyor 320 will also be described subsequently.

An alternate construction of hopper 300 is illustrated in FIGURE 8a and is designated by reference numeral 300a with corresponding bottom wall 302a and side walls 304a. A slanted floor member 400 is fixed to the side walls 304 as by welding and has suitably mounted to the underside thereof a relatively small motor 402 driving an eccentric weight 404. The hopper 300a is open to the ascending conveyor flights 332 to permit direct entry of bobbins onto said flights and the bobbins are aided by the vibration imparted to floor member resulting from the action of motor 402 driving eccentric weight 404. Each flight 332 is large enough to carry only one bobbin thereon such that when a bobbin has been received on a flight, all other bobbins in the hopper 300a will be refused entry thereon.

Numeral 320 designates the vertical or elevator conveyor which primarily serves to transport bobbins between the hopper 300 and horizontal conveyor 12. The elements of the elevator conveyor will now be described. Mounted at the top of support element 14 is a shaft 322 to which is fixed a pair of spaced apart idler sprockets 324. Likewise, a pair of spaced apart drive sprockets 326 are rotatably mounted to shaft 328 at the base of support element 14, sprockets 326 located directly beneath their corresponding sprockets 324. A chain 330 is carried by each idler-drive sprocket pair. By means of suitable gearing (not shown) motor M drives shaft 328 for rotating sprockets 326 thereby imparting motion to chains 330. Fixed at spaced intervals to the links of the chains and extending therebetween are double-faced flights 332 which are adaptable to support bobbins thereon.

Also rotatably mounted to the walls of support element 14 is a shaft 334 to which is fixed sprocket 336 engaging chain 337 and a cam 338 which is engageable with follower 316. Through chain 337 and a sprocket not shown, sprocket 336 is driven by motor M to impart rotation to cam 338. Clockwise rotation of sprockets 326 (FIGURE 8) is seen to carry conveyor flights 332 in an upward direction adjacent delivery trough 318 in a position to receive bobbins B therefrom. Simultaneously, cam 338 imparts a reciprocating movement to feeder plates 314 and 315 through cam follower 316 by which action wound bobbins are continually fed by gravity into trough 318 for eventual delivery onto the chain flights 332.

The top of the elevator conveyor is located adjacent one end of the horizontal conveyor (see FIGURE 1). Ramp 340 fixed to the top of support element 14 and positioned to receive bobbins thereon from the flights 332 as they cross the zenith, delivers them to bobbin receiving plate 341 which is mounted to the uppermost portions of channel member 18 and which extends between flights 332 and first of the trap plates 38. Mounted to the structure of the horizontal conveyor for rockable movement on pivots 342 is bobbin bin 344 which serves to receive returning bobbins from the lower channel and to direct them onto the flights of the elevator conveyor. The bobbin bin has a floor and three side walls, the end nearest the elevator conveyor being open to permit passage of a bobbin thereonto.

A pivot arm 346 is loosely pinned at one end at 346a to a side wall of bin 344 and at the opposite end to dog leg 348. The latter, which is mounted for pivotal movement about stud 350, has a roller 352 secured thereto as by a pin 354 permitting rolling motion thereon. A cam 356 is fixed for rotation on shaft 322, and spring 358 mounted at one end to the structure of the horizontal conveyor and at the other end to dog leg 348 urges roller 352 into contacting engagement thereon. Thus, as the chains 330 advance the flights thereon, cam 356 is rotated on shaft 322 and causes rocking movement of bin 344 about pivots 342 through dog leg 348 and pivot arm 346. Unneeded bobbins returning along the floor of channel member 18 in the general direction of the elevator conveyor drop into the bin 344 from whence the rocking movement just described causes them to roll one by one onto the descending flights 332. It will be appreciated that a wound bobbin returning from the horizontal conveyor will be transferred from the rear face of one flight to the front face of the next succeeding flight as it crosses the nadir of its journey on the elevator conveyor (see FIGURE 8), i.e., as it terminates its downward movement and begins its upward movement. Curved base plate 350 fixed to support element 14 which in turn rests on legs 352, is located at the lowermost end of the elevator conveyor and is generally concentric with sprockets 326 to closely envelop the flights of the conveyor.

With particular regard to horizontal conveyor 12, once bobbins travel beyond receiving plate 341 (see FIGURE 8) in their journey alongside the winding machine 10, they are supported on the upper surfaces of trap plates 38 and are moved along by stampings 31. The spacing between adjacent trap plates 38 is relatively small so that the bobbins move without difficulty from one trap plate to another. Should a bobbin not be received into any of the upper reserve bobbin magazines 72, it will pass over the trap plate 38 most remote from vertical conveyor 320, thence will drop between a pair of vertically disposed guide plates 55 and 57 onto the floor of channel 18. Plate 55 is shown (FIGURE 3) fastened to channel 18 by means of screws 59, and although not illustrated, plate 57 may be likewise fastened to channel 18. With the bobbin resting on the floor of channel 18, a stamping moving in the direction of the elevator conveyor 320 engages the end of the bobbin for the return trip to vertical conveyor 320. Upon reaching the vertical conveyor the bobbin is delivered onto bobbin bin 344 which in turn delivers said bobbin onto a descending flight 332 of the elevator conveyor 320. The bobbin is subsequently redelivered to the horizontal conveyor and the process is repeated until the bobbin is eventually received into a reserve magazine 72.

A dispatch mechanism is provided which ordinarily acts to release a bobbin from the hopper 300 via trough 318 onto the face of a flight 332. However, said mechanism also acts to prevent a fresh bobbin from being delivered to the conveyor in the event a bobbin returning from the horizontal conveyor in the manner just described is already carried on a flight of the elevator conveyor.

Figure 10:
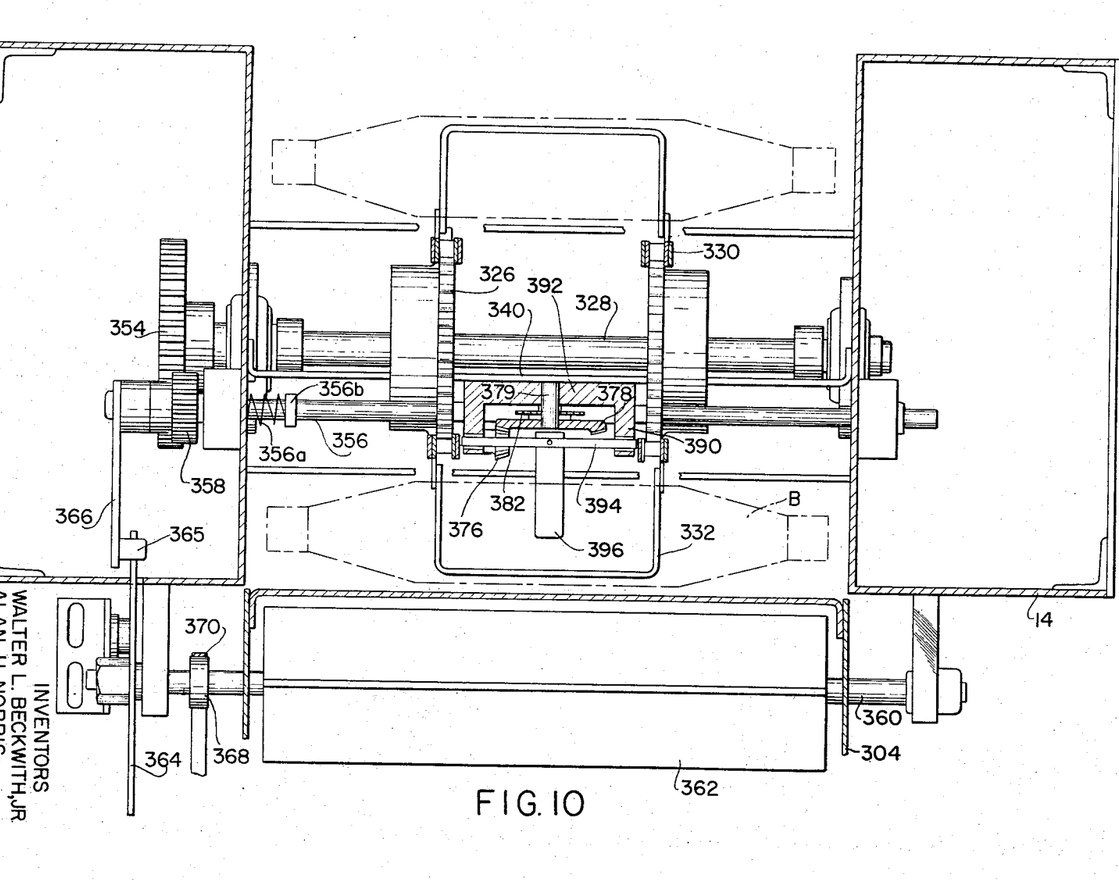
FIGURE 10 is a top plan view, partly in section, schematically showing the bobbin interrupting mechanism.
Figures 20, 21:
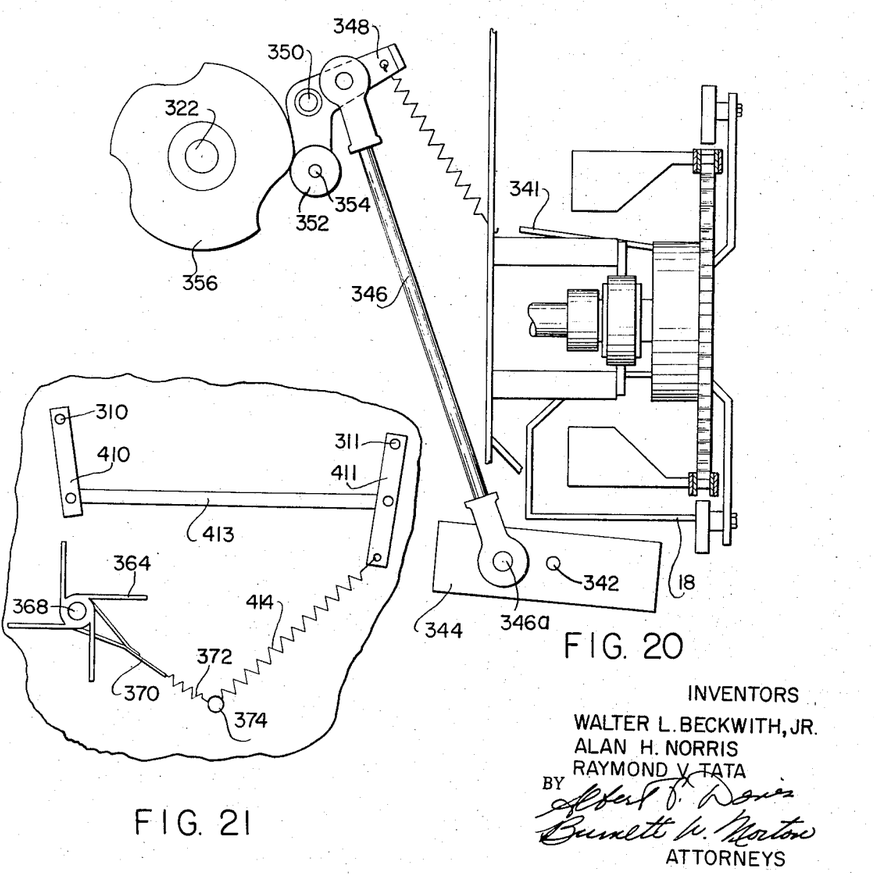
FIGURE 20 is a side elevation view taken along lines 21—21 in FIGURE 1 showing the rockable bin connecting the horizontal and vertical conveyors for directing returning bobbins onto descending flights of the vertical conveyor.
FIGURE 21 is a side elevation view taken along lines 20—20 in FIGURE 1 and illustrating linkage for operating the hopper feeder plates.

With particular reference to schematically drawn FIGURE 10, gear 354 is seen fixed for rotation on shaft 328 at one end thereof. Shaft 356, generally parallel to shaft 328, is mounted for rotation and for axial movement on support element 14 and has a gear 358 fixed thereto and in engagement with gear 354. Shaft 356 is normally biased to the right by means of spring 356a which bears against a side wall of support 14 and collar 356b fixed on said shaft. Yet another shaft indicated at 360 is likewise positioned parallel to shaft 328 and mounted for rotation on hopper walls 304. A star shaped vending plate 362 having four compartments formed thereon is fixed to shaft 360 midway between the ends. At one end of the shaft is fixed a spur wheel 364 which is engageable by cam 365 on arm 366 fixed to the end of shaft 356 adjacent gear 358. Also fixed to shaft 356 between spur wheel 364 and vending plate 362 is a collar 368 receiving in contacting engagement thereon a tension strap 370 (see FIGURES 9 and 21) which may be of leather or other suitable material having a relatively high coefficient of friction. The ends of the strap 370 are engaged by one end of a tension spring 372 whose other end is secured to a wall 304 of the hopper 300 as by screw 374. Strap 370 prevents rotation of shaft 356 and vending plate 362 thereon beyond the one-quarter turn imparted by the cam arm 366.

As drive shaft 328 operates to advance the flights 332 of the vertical conveyor, gear 354 on said drive shaft acts to rotate shaft 356 through gear 358. Cam arm 366 is thereby rotated to engage spur wheel 364 rotating said spur wheel and vending plate 362 one-quarter of a turn, spur wheel 364 having four equally spaced radially extending arms. The timing between the flights 332 and the geneva mechanism, as defined by cam arm 366 and cooperating spur wheel 364, is predetermined so that vending plate 362 is operable to deliver a fresh bobbin from trough 318 to a flight 332 at precisely the moment when the flight is positioned adjacent to said trough.

The mechanism employed to prevent the dispatch of a fresh bobbin from trough 318 in the event a bobbin is already present on a flight of the elevator conveyor will now be discussed with particular reference to FIGURES 9 and 10. Cross member 340 is suitably secured to the support element 14, and extending between the two sides thereof, supports yoke 368 thereon. Supported for rotation in suitable bearings on the arms 390 of yoke 392 is shaft 394 to which is fixed centrally thereof a projecting tab 396, and adjacent one of said arms, a bevel gear 376. A second bevel gear 378 is in engagement with said gear 376 and is secured to a stub shaft 379 which is journaled for rotation in the shoulder portion of yoke 392. A segment gear 382 is fixed to bevel gear 378 and is engageable with gear 380 being constituted as a rack of revolution fixed on shaft 356, that is to say, a gear having a plurality of circumferential teeth which do not have a lead angle.

It will now be apparent that upward pivotal movement of projecting tab 396 on shaft 394 serves to impart arcuate movement to gear segment 382 via bevel gears 376 and 378, and by means of gear 380 imparts movement of shaft 356 to the left as viewed in FIGURE 10. This movement of shaft 356 causes cam arm 366 to assume a position out of engagement with spur wheel 364 such that rotation of shaft 356 is uneffective to rotate shaft 360 with vending plate 362 thereon. Projecting tab 396 is situated in the path of elevating bobbins supported on conveyor flights 332. Engagement of said projecting tab by a bobbin therefore prevents the introduction of a fresh bobbin from the hopper 300 to the presently occupied flight. Spring 356a serves to return shaft 356 to the right and cam arm 366 and cam 365 thereon to a position engageable with spur wheel 364 when an ascending bobbin is no longer in engagement with tab 396.

*Overall operation*

The structure of the invention having been described, the overall operation of the bobbin replenishing apparatus will now be summarized with recourse to the appropriate reference numerals.

Bobbin hopper 300 located at the far end of a winding machine 10 is the primary source for wound bobbins to be employed therein. These bobbins are to be transferred to each of the upper reserve bobbin magazines 72 via vertical conveyor 320 and horizontal conveyor 12. To this end, motor M drives sprockets 326 for advancing chain 330 and flights 332 thereon. By means of chain 337 driving sprocket 336 and cam 338 integral therewith, plates 314 and 315 are rocked so as to urge bobbins into delivery trough 318.

By means of the geneva mechanism as defined by spur wheel 364 and arm 366, vending plate 362 is rotated in synchronism with chain 330 to receive into one of its four compartments a bobbin from trough 318 and to transfer said bobbin onto a flight 332. The process of receiving a bobbin from trough 318 and delivering it to a flight 332 occurs during a one-quarter rotation of said vending plate.

However, should a bobbin returning from the horizontal conveyor 12 already be supported on a flight 332, the bobbin ascending thereon, would engage projecting tab 396 which operates to move cam 365 out of the plane of spur wheel 364 to prevent engagement therewith. In this manner, vending plate 362 is inactivated and thus prevented from delivering a bobbin onto a conveyor flight until such time that an empty flight moves into position adjacent to said vending plate. The bobbins are conveyed upward to the top of conveyor 320 at which location they are discharged onto ramp 340 down which they roll to be received on plate 341 and engaged by a stamping 31 for horizontal translation to positions near to the plurality of winding stations 20. It will be obvious that the speed of movement of the stampings 31 on chain 28 is synchronized with the elevational speed of flights 332 such that a stamping 31 will assume a bobbin engaging position for each bobbin discharged onto ramp 340.

From plate 341, the bobbins are moved along onto the upper surfaces of trap plates 38. If an upper magazine 72 has a vacancy therein, no bobbin will rest on lower side 64 of swivel plate 60, and under gravity, plate 60 will rock to the position shown in FIGURE 5b. Simultaneously, when the bobbin B arrives at a position resting fully on trap plate 38, said plate will pivot clockwise and come to rest on the upper surface of upper side 62. It will be recalled that cam member 52 remains in holding engagement with lip 50 formed on plate 38 until such time that the bobbin rests fully thereon so that the bobbin will descend squarely into the magazine 72. The weight of the bobbin resting on lower side 64 of swivel plate 60 rotates said plate clockwise releasing the bobbin into magazine 72. As plate 60 rotates, the upper edge of side 62 engages the lower surface of plate 38 which together with weight 48 pivots plate 38 in a counterclockwise direction to its original position (FIGURE 5a). As the last bobbin to enter magazine 72 comes to rest on lower side 64 as seen in FIGURE 2, additional bobbins are prevented from entering because the uppermost edge of side 62 maintains trap plate 38 in its raised position. Of course, as the supply of bobbins in magazine 72 becomes depleted to the extent that a bobbin no longer rests on side 64, new bobbins passing across plate 38 will be allowed entry into the magazine.

Guided by flanges 77, and with its ends engaged by slides 76, a bobbin descends into magazine 72 until it is halted by and rests upon catch plate 160 as seen in FIGURE 2. As an exhausted bobbin is released from chamber 94, and a wound bobbin is called for from the magazine 80, cam follower 152 is actuated by outside mechanism such that segment 146 contacts the bottom of bobbin B, lifting it over stop 144 and depositing it into chamber 94. Thereupon, spring 138 acts to draw arm to the right or clockwise as seen in FIGURE 11 so that pusher bar 110 engages the bobbin farthest from chamber 94 urging it and the bobbins in front of it toward the chamber until the forwardmost bobbin reaches stop 144. As the result of the clockwise movement of arm 119, pin 216 moving therewith, engages cam follower 214 which pivots dog leg 204 in a counterclockwise direction about stub shaft 206. Thus cable 188 is drawn to the left (see FIGURE 9) or downward (see especially FIGURE 6a) so that latch 186 engages projection 196 of catch plate 160, rotating the latter counterclockwise from the position of FIGURE 6a to that of FIGURE 6b. Thereupon, the bobbin B is discharged from magazine 72, descending upon the support surface 198 of plate 162 (FIGURE 6b).

Simultaneously, anvil 136, which similar to cam follower 152 is actuated by outside mechanism, moves arm 119 leftward or counterclockwise about stub shaft 122 to the position of FIGURE 11. Pin 216 moving therewith moves in like manner and tends to rotate away from engagement with cam follower 214. The weight of bobbin B resting on shelf 198 rotates plate 160 from the position of FIGURE 6b to that of FIGURE 6a, projection 196 moving latch 186 upward with the aid of spring 178 and pivoting dog leg 204 clockwise (FIGURE 9) to the extent permitted by pin 216. Bobbin B rolls down shelf 240 into funnel 230, thence through chute 270, arriving in lower magazine 80 in generally upright condition. As arm 119 is pivoted counterclockwise, pusher bar 110 activated thereby moves leftward and is urged from the extended position of FIGURE 15 to the retracted position of FIGURE 17, retracting behind the bobbin B just delivered to the magazine. Upon reaching the far left hand end (FIGURE 11) of the magazine, arm 119 is no longer under the influence of anvil 136, the external actuating means having moved out of engagement therewith. Accordingly, arm 119 is once again pivoted clockwise under the bias of spring 138 and pusher bar 110 is returned to the extended position of FIGURE 15 to engage newly arrived bobbin B and move it adjacent to the other bobbins located in the magazine.

In the event none of the upper magazines 72 has a vacancy therein, a bobbin B will continue along on the upper surfaces of plates 38 under the urging of stamping 31. When the bobbin reaches and passes over the last of the trap plates 38, it drops between guide plates 55 and 57 onto the floor of channel member 18. Another stamping 31 returning toward the elevator conveyor 320 engages the bobbin to continue its journey. Reaching the end of channel member 18, the bobbin is dropped onto bobbin bin 344 which rockingly delivers it onto a descending flight 332. The bobbin will repeat its journey as described until it is eventually introduced to an upper magazine 70.

While the apparatus just described has been presented as having a particular form and construction, it will be readily apparent that many modifications and improvements may be made without departing from the scope and spirit of the invention. It will therefore be understood that the invention is not to be limited by the illustrated embodiment but only by the scope of the appended claims.

In the claims:

1. For use with an automatic winding machine adapted to wind yarn from an active bobbin to a take-up package, apparatus for continuously replenishing the supply of wound bobbins as their number is depleted comprising: a source of wound bobbins; a first reserve bobbin magazine; a second reserve bobbin magazine spaced from said first magazine and located adjacent the winding mechanism of said machine; means conveying bobbins from said source to said first magazine; bobbin transfer means for guiding bobbins from said first magazine to said second magazine; holding means associated with said first magazine and movable between a first position for retaining bobbins therein and a second position for releasing a bobbin from said first magazine to said transfer means; means mounting said holding means for movement between said first and second positions; and actuating means associated with said second magazine for moving said holding means to said second position when a vacancy occurs in said second magazine.

2. The apparatus set forth in claim 1 wherein said second magazine is located below said first magazine; and wherein said bobbin transfer means includes a funnel to receive bobbins from said first magazine and a chute for receiving bobbins from said funnel and directing them to said second magazine.

3. The apparatus set forth in claim 1 wherein said holding means includes a plate and an extension on said plate; and wherein said actuating means includes a latch engageable with said extension for moving said plate to said second position.

4. The automatic mechanism set forth in claim 1 wherein said holding means includes a plate positioned adjacent said conveying means and adapted to receive a bobbin thereon; means biasing said plate to said first position and including; a second pivotally mounted plate cooperating with said first plate in spaced parallel relationship therewith and adapted to receive a bobbin thereon; flange means on said second plate engageable with said first plate to prevent the downward pivotal movement of said first plate when a bobbin is received on the other side of said second plate; said second plate pivotable to disengage said flange means from said first plate when a bobbin is released therefrom, thereby permitting the downward pivotal movement of said first plate by the weight of a bobbin thereon.

5. The automatic mechanism set forth in claim 4 wherein said first plate includes an elongated lip; and including a holding member fixed to said conveying means and engageable with said lip to prevent pivotal movement of said first plate until a bobbin rests completely thereon.

6. For use with an automatic winding machine adapted to wind yarn from an active bobbin to a take-up package, apparatus for continuously replenishing the supply of wound bobbins as their number is depleted comprising: a winding mechanism; a hopper providing a source of wound bobbins; an elevator conveyor arranged to receive bobbins from said hopper onto a plurality of flights thereon; magazine means for retaining a plurality of bobbins prior to advancing said bobbins one at a time into said winding mechanism; a transverse conveyor arranged to receive bobbin thereon for delivery to said magazine means but returning the bobbins to said elevator conveyor in the event said magazine means is filled to capacity; and means mounted on said hopper and associated with said elevator conveyor for sensing a bobbin supported on a flight thereof returning from said transverse conveyor and denying entry of a new bobbin onto said flight.

7. The automatic mechanism set forth in claim 6 wherein said sensing means comprises: a projecting tab mounted adjacent to said hopper for pivotal movement and disposed for engagement by a bobbin returning on said elevator conveyor from said transverse conveyor; a delivery mechanism for advancing bobbins onto said elevator conveyor from said hopper at predetermined intervals; means interconnecting said projecting tab and said delivery mechanism for denying entry of a bobbin onto a flight of said elevator conveyor already occupied by said returning bobbin.

8. The automatic mechanism set forth in claim 7 wherein said interconnecting means includes a rocking shaft supporting said projecting tab and a bevel gear spaced therefrom; a stub shaft positioned generally normal to said rocking shaft and mounted for pivotal movement; a second bevel gear fixed to said stub shaft and in engagement with said first bevel gear; a gear segment fixed to said stub shaft adjacent said second bevel gear; a first shaft having a vending plate fixed for rotation and adapted to receive a bobbin thereon from said hopper for delivery to said flight; a spur wheel fixed to said first shaft for rotation thereon; a second shaft generally parallel to said first shaft mounted for rotation and for axial movement; means for rotating said second shaft; gear means fixed to said second shaft and engageable with said segment gear; a cam lever fixed to said second shaft; and means biasing said cam lever into engaging position with said spur wheel whereby a bobbin engaging said projecting tab moves said cam lever out of engaging position with said spur wheel to prevent rotation of said vending plate.

9. The automatic mechanism set forth in claim 6 further including a spur wheel for delivering bobbins from said hopper to said elevator conveyor, a feeder plate in said hopper, and means oscillating said feeder plate whereby bobbins are urged into supporting engagement on said spur wheel.

10. For use with an automatic winding machine adapted to wind yarn from an active bobbin to a take-up package, apparatus for continuously replenishing the supply of wound bobbins as their number is depleted comprising: a winding mechanism; a hopper providing a source of wound bobbins; an elevator conveyor arranged to receive bobbins from said hopper onto a plurality of flights thereon; means for driving said elevator conveyor; receptacle means supporting bobbins prior to advancing said bobbins one by one into said winding mechanism; a transverse conveyor arranged to receive bobbins thereon for delivery to said receptacle means, but returning the bobbins to said elevator conveyor in the event said magazine means is filled to capacity; means mounted on said hopper and associated with said elevator conveyor sensing a bobbin supported on a flight thereof returning from said transverse conveyor and denying entry of a new bobbin onto said flight; said hopper having apparatus actively feeding bobbins onto said elevator conveyor including a shaft pivotally mounted on said hopper; a feeder plate fixed to said shaft and adapted to support bobbins thereon; cam means rotated by said driving means; and link means fixed at one end to said shaft and having a cam follower at the opposite end thereof in engagement with said cam, whereby rotation of said cam imparts a rocking motion to said feeder plate.

11. For use with an automatic winding machine adapted to wind yarn from an active bobbin to a take-up package, apparatus for continuously replenishing the supply of wound bobbins as their number is depleted comprising: a winding mechanism; a hopper providing a source of wound bobbins; an elevator conveyor arranged to receive bobbins from said hopper into a plurality of flights thereon; drive means; reserve bobbin receptacle means retaining bobbins prior to advancing said bobbins one at a time into said winding mechanism; a transverse conveyor arranged to receive bobbins thereon from said elevator conveyor for delivery to said receptacle means; means returning the bobbins to said elevator conveyor in the event said receptacle means is filled to capacity including bin means rockably supported on the fixed frame of said elevator conveyor and disposed below said transverse conveyor; cam means rotatable by said drive means; and cam follower means engaging said cam and connected to said bin whereby rotation of said cam serves to oscillate said bin thereby urging bobbins onto the flights of said elevator conveyor.

12. The automatic mechanism set forth in claim 11 wherein said receptacle means comprises: a first magazine receiving bobbins from said transverse conveyor; means associated with said first magazine normally retaining bobbins therein but movable to a release position; and a second magazine holding bobbins closely adjacent to the winding mechanism and having latch means associated therewith for activating said first retaining means to a release position as one of the bobbins is advanced into the winding mechanism from said second magazine; said first magazine being positioned above said second magazine; and a chute connecting said first magazine to said second magazine for directing bobbins released from said first magazine into said second magazine.

13. The automatic mechanism set forth in claim 12 further including means associated with said hopper and said elevator conveyor sensing a bobbin supported on a flight thereof returning from said transverse conveyor and denying entry of a new bobbin onto said flight.

14. The automatic mechanism set forth in claim 13 wherein said sensing means comprises: a projecting tab supported on said hopper for pivotal movement thereon and disposed to engage a bobbin returning from said transverse conveyor on said elevator conveyor; a delivery mechanism for advancing bobbins onto said elevator conveyor from said hopper at predetermined intervals; and means interconnecting said tab means and said delivery mechanism denying entry of a bobbin onto a flight of said elevator conveyor already occupied by a bobbin.

References Cited

UNITED STATES PATENTS

| | | | |
|---|---|---|---|
| 2,350,927 | 6/1944 | Reiners et al. | 242—35.5 |
| 2,600,793 | 6/1952 | Molloy | 242—35.5 |
| 2,665,854 | 1/1954 | Siegenthaler et al. | 242—35.5 |
| 2,733,014 | 1/1956 | Hattman | 242—35.5 |
| 3,111,280 | 11/1963 | Reiners et al. | 242—35.5 |
| 3,154,904 | 11/1964 | Furst | 242—35.5 X |
| 3,224,694 | 12/1965 | Oishi | 242—35.5 |
| 3,279,710 | 10/1966 | Raasch | 242—35.5 |

FOREIGN PATENTS 263,928  12/1949  Switzerland.

STANLEY N. GILREATH, *Primary Examiner.*